Jan. 31, 1950

W. W. CARPENTER

RECORD SCANNER WITH MEANS TO PREVENT FALSE OPERATION 2,496,150

Filed Nov. 28, 1947

3 Sheets-Sheet 1

INVENTOR
W. W. CARPENTER
BY John A. Hall
ATTORNEY

Jan. 31, 1950

W. W. CARPENTER
RECORD SCANNER WITH MEANS TO PREVENT FALSE OPERATION 2,496,150

Filed Nov. 28, 1947

3 Sheets-Sheet 2

INVENTOR
W. W. CARPENTER
BY John A. Hall
ATTORNEY

Jan. 31, 1950

W. W. CARPENTER

RECORD SCANNER WITH MEANS TO PREVENT FALSE OPERATION 2,496,150

Filed Nov. 28, 1947

3 Sheets-Sheet 3

INVENTOR
W. W. CARPENTER
BY [signature]
ATTORNEY

Patented Jan. 31, 1950

2,496,150

UNITED STATES PATENT OFFICE 2,496,150

RECORD SCANNER WITH MEANS TO PREVENT FALSE OPERATION

Warren W. Carpenter, Garden City, N. Y., assignor to Bell Telephone Laboratories, Incorporated, New York, N. Y., a corporation of New York Application November 28, 1947, Serial No. 788,449

4 Claims. (Cl. 177—380)

This invention relates to record scanning devices and particularly to devices for transmitting intelligence recorded by perforations on a tape.

The object of the invention is to provide means to prevent a false operation under certain emergency conditions. The invention is applied to apparatus employed in the automatic preparation of charges billed to subscribers and, therefore, perfection in operation is of unusual importance.

In a previously proposed type of automatic message accounting system, a record of all calls is made in the form of a perforated tape which at certain regular intervals is removed from the recorder for conversion into subscribers' bills. The first step in this conversion is the assembly of the various items of information for each message and the first piece of apparatus to which the record tape is subjected is known as a tape reader similar in certain fundamental respects to a known type of tape transmitter commonly employed in the printing telegraph art. The tape reader of the automatic message accounting system differs from the telegraph tape transmitter in many important details however. In the present case the advance of the tape from one code to the next is separately and independently controlled for there are many instances where a code must be read repeatedly so that the tape must not be advanced after one reading. The sensing fingers operate constantly and periodically and while there are times when a plurality of different codes are read on successive operations of the sensing fingers there are other times when the tape remains stationary and such fingers repeatedly operate over a single code.

The advance of the tape is controlled by a tape advance magnet and the tape may be advanced only when this magnet is deenergized, at which time a pawl and ratchet mechanism for moving the tape step by step is brought under control of the mechanism which moves the sensing fingers so that the advance of the tape may be brought about at an appropriate interval.

Now there are occasions when the power is cut off and since this will result in the deenergization of the tape advance magnet one result of this power stoppage may be an advance of the tape so that upon the reapplication of the power the operation of reading the tape will be taken up at the wrong place with a consequent possible mutilation of a message record. The present invention provides means to prevent such a false advance of the tape. In its preferred form this takes the form of a stop magnet which will interpose a mechanical stop in the path of the pawl and ratchet mechanism and thus prevent its mechanical action upon the deenergization of the tape advance magnet. This stop magnet is in an electrical circuit whereby it becomes energized after the tape advance magnet is energized, remains energized continuously during the operation of the tape reader and when the power is shut off is released before the tape advance magnet is released. It is effective to prevent an advance of the tape only when it is deenergized.

A feature of the invention is a device for interfering with the action of a record advance mechanism automatically rendered effective when power is cut off from a record scanner.

Another feature of the invention is a primary and a secondary control for a record advance mechanism both of which will prevent it from functioning, the first of which operates under an operation control and the second of which acts as a guard over the first and substitutes therefor under certain specific emergency conditions.

Record scanners of the type to which the present invention is added as an improvement and spoken of specifically as readers are disclosed in the following applications:

| Inventor | Serial Number | Filing Date |
|---|---|---|
| W. W. Carpenter, J. W. Gooderham | 724,992 | Jan. 29, 1947. |
| W. W. Carpenter | 666,280 | May 1, 1946. |
| A. J. Busch, E. Vroom | 772,078 | Sept. 4, 1947. |
| J. W. Gooderham, A. E. Hague, A. C. Powell | 920 | Jan. 7, 1948. |

Other features will appear hereinafter.

The drawings consist of three sheets having four figures as follows.

Figure 1:
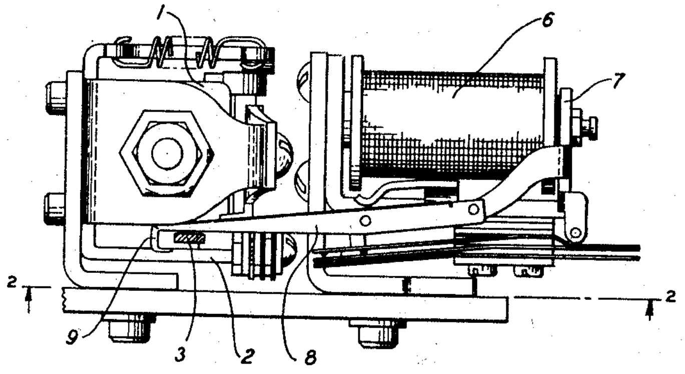
Fig. 1 is a top view of the step magnet and the stop magnet in their spatial relation to each other.

The reader consists essentially of a perforated drum 24 over which a perforated tape 25 is passed, the perforations of the tape registering with the holes in the face of the drum. There are twenty-eight pins such as the AO pin 26 which are constantly being lifted away from the tape and then allowed to approach the tape to probe the perforations therein, by means of a cam 27 operated by a motor 28. When any one of the pins encounters a perforation (when the cam 27 has been rotated 180 degrees from the position shown) it will move far enough to close its associated contact. If instead the pin encounters a blank portion of the tape the movement of the pin will be insufficient to close the associated contact.

Other contacts, for control purposes with which we are not at present concerned are shown as being operated directly by the cams 27 and 29.

Figure 2:
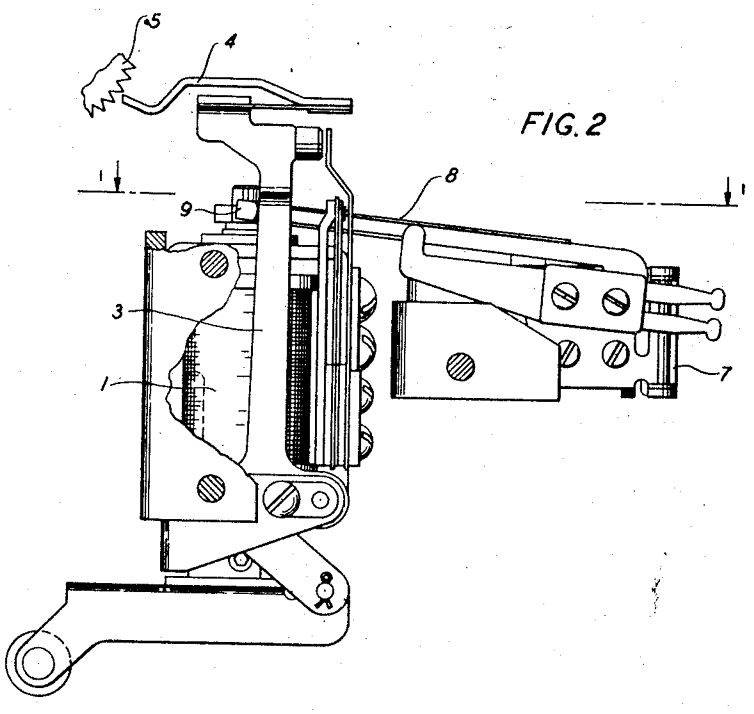
Fig. 2 is a side view of the same.
Figure 4:
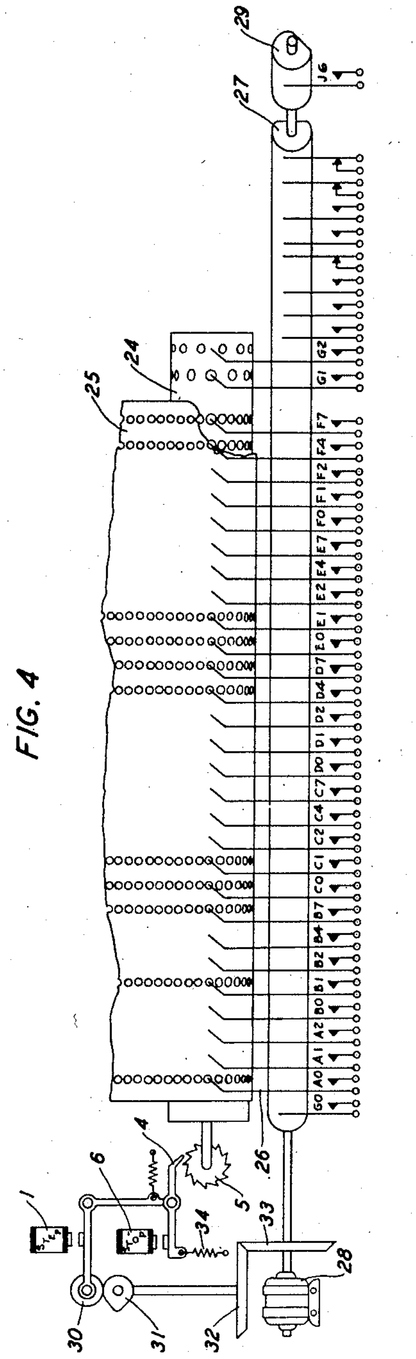
Fig. 4 is a schematic diagram of a reader.

It will be understood that the showing in Fig. 4 is schematic in order to explain the general operation of the reader, and that the actual mechanical arrangement is as shown in Figs. 1 and 2. Thus the step magnet 1 and stop magnet 6, as shown in Fig. 4 are arranged so that the pawl 4 can engage and move the ratchet wheel 5 only when the stop magnet 6 is energized and the step magnet 1 is deenergized. At such a time the roller 30 attached to the armature of the step magnet 1 will be moved by the cam 31, which is geared by the gears 32 and 33 to the shaft of the motor 28. If the stop magnet 6 becomes deenergized, then the spring 34 moves the pawl 4 to such a position that despite any movement of the armature of the step magnet 1, the ratchet cannot be engaged and moved. The actual mechanical construction and operation of these elements is as follows.

The step magnet consists of a solenoid or coil 1 which operates an armature 2, carrying an arm 3 to actuate a pawl 4 to move a ratchet 5. The stop magnet consists of a coil 6, having an armature 7 and carrying a formed metal piece 8, having a hook-shaped termination 9 normally positioned so as not to interfere with the element 3 of the step magnet. The position in which this hook-shaped extension 9 is said to be normal is during the energization of the stop magnet 6, since it is designed in its circuit operation to be normally always operated. When the power supply for the device is interrupted, however, the stop magnet will become deenergized whereupon the end of the hook-shaped piece 9 will move into the path of the element 3 and mechanically prevent the step magnet from returning its armature to its unoperated position.

This arrangement of a means for interposing a stop in the path of the step magnet is one found to be necessary in the reader of a device for reading codes in a perforated tape. Under normal operation the step magnet is operated and while so operated will allow the fingers of the reader to repeatedly sense the same code in a tape. When it is wished to advance the tape, however, the step magnet is deenergized and in returning to its normal unoperated condition, its pawl 4 will engage the ratchet 5 and cause the tape to advance. It has been found, however, that under certain emergency conditions, when, for instance, the power supply may be interrupted, it is not wished to have the tape advanced. The interruption of the power supply, however, would deenergize the step magnet and, therefore, cause the tape to advance regardless of the circuit conditions which have been established to prevent such an operation. Therefore, the stop magnet is provided to mechanically interpose a stop for preventing this improper operation of the step magnet.

Figure 3:
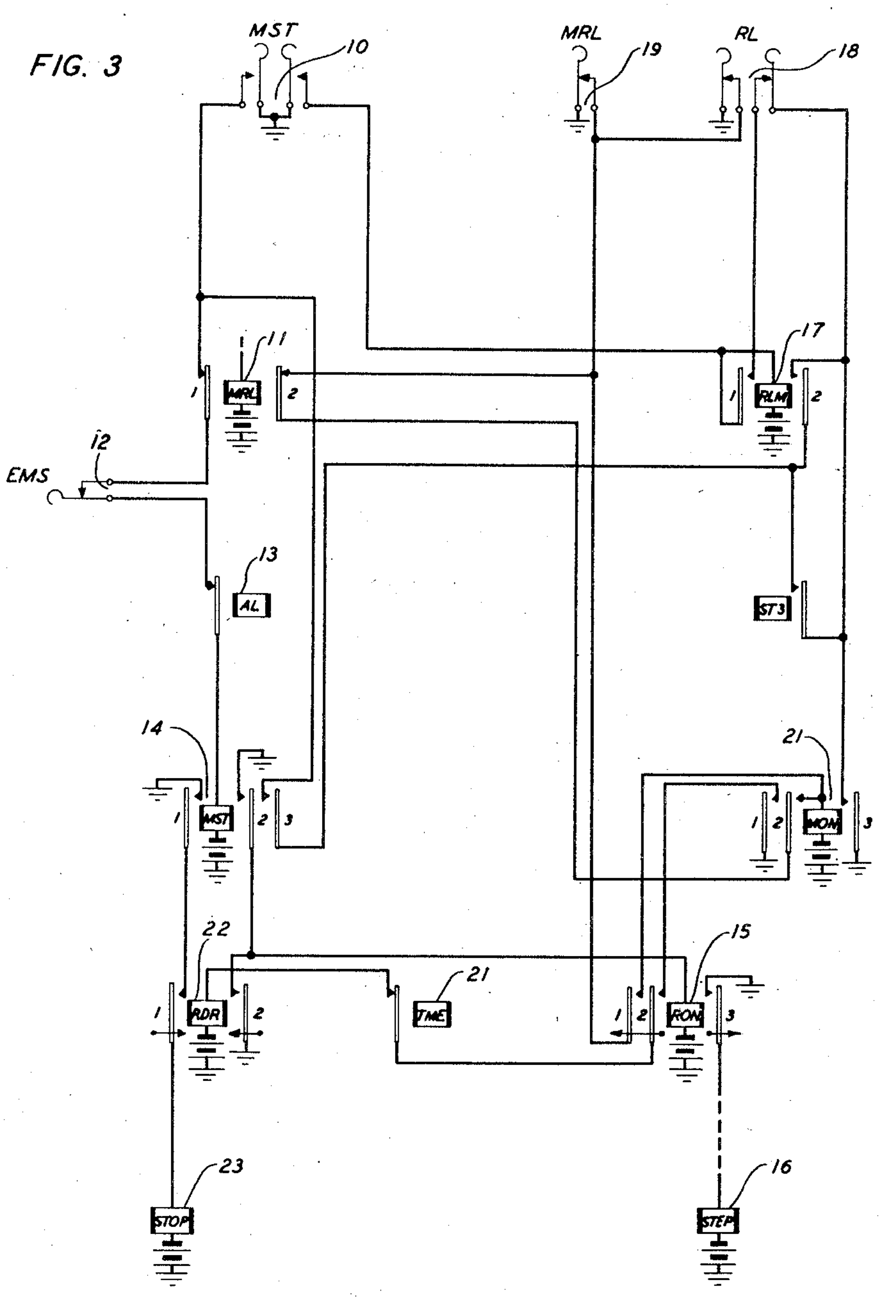
Fig. 3 is a schematic circuit diagram showing the manner in which the operation of these magnets is controlled.

The circuit for accomplishing this operation is shown in Fig. 3. In this figure the motor start key 10 is first operated This will establish a circuit from ground through the left-hand contact thereof, the back contact of a master release relay 11, an EMS key 12, the back contact of an alarm relay 13 to the winding of the master start relay 14. The master start relay 14 establishes a circuit from ground through its front contact and armature 2 and the winding of the RON relay 15 which is substantially fast to operate and slow to release. The RON relay 15 may, therefore, be considered as operating immediately and closing a circuit from ground through its front contact and armature 3 to the step magnet 16. The circuit of the step magnet is shown in dotted lines to indicate that this circuit also goes through other controlling circuits with which we are not at present concerned.

The master start key 10 also closes a circuit from ground through its right-hand contacts to the RLM relay 17 which thereupon locks in a circuit from the master start key, its left-hand contacts, the front contact and armature 3 of the master start relay 14, the armature 2 and front contact of the RLM relay 17, the right-hand contact of the RL key 18, the front contact and armature 1 of the RLM relay 17 to the winding thereof.

Upon the energization of the RON relay 15 a circuit is established from ground through the normal contacts of the MRL key 19, armature 1 and front contact of the RON relay 15 through the winding of the MON relay 20. This relay supplies grounds to a large number of points in the circuit, only two of which are here shown. Through its armature 3 and front contact it supplies an additional path for holding the RLM relay operated. Through its armature 2 and front contact it locks through the armature 2 and back contact of the MRL relay to the ground supplied by the MRL key 19 and the RL key 18. Through its armature 1 and front contact the MON relay 20 extends a ground through the front contact and armature 2 of the RON relay 15, the armature and back contact of the TME relay 21 to the winding of the RDR relay 22. This relay now becomes operated and extends a circuit from ground through the front contacts and armature 1 of the MST relay 14, the front contact and armature 1 of the RDR relay 22 to the winding of the stop magnet 23. The RDR relay is somewhat slow to operate so that it will be seen that when the motor start key 10 is operated the step magnet 16 will first be operated and thereafter the stop magnet 23 will be operated. When the device is shut down as, for instance, by releasing the motor start key 10, then upon the release of the MST relay 14 the circuit of the stop magnet will be opened both through the release of the MST relay 14 and the almost immediate release of the RDR relay which is slow to operate but fast to release. The step magnet 16, however, is held operated for a slight interval by the slow releasing characteristics of the RON relay 15. Therefore, when the operations of the device are stopped the relative sequence or timing of the release of the stop and step magnets is reversed from that upon their energization.

What is claimed is:

1. In a record scanner, a plurality of scanning elements, means for periodically and continuously reciprocating said elements, means for moving a record to bring a representation of recorded matter in the path of said scanning elements, an advance magnet for controlling the advance of said record from one representation to another, advance means rendered operative on the release of said advance magnet and a stop magnet for blocking said advance means when said advance magnet is released, whereby a false advance of a record may be prevented when said scanner is stopped and said advance magnet is released as a consequence thereof 2. In a record scanner, the combination with a record having intelligence recorded thereon in the form of groups of indicia, a plurality of scanning elements for use in cooperative relationship with one group of said indicia at a time, a motor, a power supply and control means for said motor, means operated by said motor for repeatedly reciprocating said scanning elements into and out of association with said record, means for advancing said record to bring a new group of indicia into cooperative relationship with said scanning elements, means controlled by said motor for operating said advancing means during a period in the reciprocation of said scanning elements when said elements are out of association with said record, a record advance magnet controlling means upon its energization to block the said control of said motor over said advancing means, a stop magnet controlling means upon its deenergization to block the said control of said motor over said advancing means, operating control means for said record advance magnet and automatic control means associated with said motor power supply for controlling said stop magnet.

3. The combination of a ratchet wheel, a magnetically operated pawl for engaging and moving said ratchet wheel, a magnetically operated stop for holding said pawl out of engagement with said ratchet wheel, said stop being ineffective when energized, said pawl engaging and moving said ratchet upon the deenergization of said pawl magnet, means for sequentially energizing first said pawl and then said stop, and means for sequentially deenergizing first said stop and then said pawl, comprising a slow operating and fast releasing relay for closing the circuit of said magnetically operated stop, and a fast operating and slow releasing relay in the circuit of said magnetically operated pawl.

4. The combination of a ratchet wheel, a magnetically operated pawl for engaging and moving said ratchet wheel, a magnetically operated stop for holding said pawl out of engagement with said ratchet wheel, said stop being ineffective when energized, said pawl engaging and moving said ratchet upon the deenergization of said pawl magnet, means for sequentially energizing first said pawl and then said stop, means for sequentially deenergizing first said stop and then said pawl, comprising a slow operating and fast releasing relay for closing the circuit of said magnetically operated stop, and a fast operating and slow releasing relay in the circuit of said magnetically operated pawl, and controlling circuits for said pawl rendered operative during the energization of said stop.

WARREN W. CARPENTER.

REFERENCES CITED

The following references are of record in the file of this patent:

UNITED STATES PATENTS

| Number | Name | Date |
|---|---|---|
| 998,552 | Rugh | July 18, 1911 |
| 1,645,563 | Whistlecroft | Oct. 18, 1927 |
| 1,695,694 | MacFarland | Dec. 18, 1928 |

FOREIGN PATENTS

| Number | Country | Date |
|---|---|---|
| 642,115 | Germany | Feb. 23, 1937 |